United States Patent

Brandenburger et al.

[11] Patent Number: 5,082,922
[45] Date of Patent: Jan. 21, 1992

[54] MODIFIED-ACRYLATE POLYMERS AND COATING COMPOSITIONS MADE THEREFROM

[75] Inventors: Larry B. Brandenburger, Lino Lakes; Philip J. Ruhoff, Minneapolis, both of Minn.

[73] Assignee: The Valspar Corporation, Minneapolis, Minn.

[21] Appl. No.: 256,614

[22] Filed: Oct. 12, 1988

[51] Int. Cl.$^5$ ............... C08G 63/08; C08L 61/26
[52] U.S. Cl. ..................... 528/323; 528/326; 528/354; 528/359; 528/357; 528/361; 528/366
[58] Field of Search ............ 528/323, 326, 354, 359, 528/357, 361, 366

[56] References Cited

U.S. PATENT DOCUMENTS

| | | | |
|---|---|---|---|
| 4,082,816 | 4/1978 | Fisk et al. | 528/361 X |
| 4,368,320 | 1/1983 | Aldinger et al. | 528/354 X |
| 4,475,998 | 10/1984 | Okitsu et al. | 528/354 X |
| 4,504,635 | 3/1985 | Weber et al. | 528/354 X |
| 4,683,287 | 7/1987 | Koleske et al. | 528/354 X |
| 4,720,528 | 1/1988 | Etzell et al. | 525/450 |

Primary Examiner—John Kight, III
Assistant Examiner—Frederick Krass
Attorney, Agent, or Firm—Fredrikson & Byron

[57] ABSTRACT

A method is provided for producing a modified addition polymer from an ethylenically unsaturated monomer composition that includes at least one monomer having hydroxyl or carboxyl functionality. The ethylenically unsaturated monomer composition, and a free radical initiator therefor, is dissolved in a solvent-free molten composition maintained at an addition polymerization temperature, the molten composition comprising a cyclic compound reactive via ring-opening with the hydroxyl or carboxyl functionality. The resulting material is useful in the manufacture of paints in liquid or powder form.

12 Claims, No Drawings

MODIFIED-ACRYLATE POLYMERS AND COATING COMPOSITIONS MADE THEREFROM

BACKGROUND OF THE INVENTION

In the field of polymeric coatings suitable for the protection of metal and other substrates, acrylate based polymers are often used, the monomeric constituents being carefully selected so as to provide coatings exhibiting both strength and flexibility. Epsilon-caprolactone can be reacted with the hydroxyl or carboxyl groups of acrylic or methacrylic monomers or polymers prepared therefrom, and epsilon-caprolactone itself may undergo polymerization using suitable esterification catalysts such as alkali or alkaline earth metal alkoxides, the polymerization involving opening of the caprolactone ring. Fisk et al., U.S. Pat. No. 4,082,816, teaches methods in which ethylenically unsaturated monomers and epsilon-caprolactone are polymerized, by addition and ring-opening polymerization, respectively, in suitable solvent systems. The caprolactone and ethylenically unsaturated monomers may be polymerized in solution concurrently, the polymerization system including both free radical initiators and esterification catalysts, or the polymerization of the ethylenically unsaturated monomers may be carried out first in solvent solution followed by addition to the solution system of the caprolactone which undergoes condensation polymerization. U.S. Pat. No. 4,720,528 (Etzell, et al.) refers to coating compositions containing epsilon-caprolactone-modified acrylic resins polymerized in solution.

In the addition polymerization of ethylenically unsaturated monomers, temperature plays a large role in determining the polymer resin composition. In general, higher polymerization temperatures provide lower molecular weight polymer species having narrower molecular weight distributions, whereas polymerization at lower temperatures gives rise to higher molecular weight polymers with somewhat broader molecular weight distributions. Molecular weight can be controlled by other means, such as through the use of mercaptan chain transfer agents such as t-dodecyl mercaptan.

In general, the addition polymerization of ethylenically unsaturated monomers, particularly acrylic and methacrylic monomers, normally takes place in a solvent solution. The polymerization temperature generally is limited to the boiling points of the common solvents that are used, e.g., about 150° C., and chain transfer agents or other materials are employed to limit the molecular weight of the resulting polymer. Chain transfer agents such as the mercaptans can have adverse effects upon the ultimate properties of polymeric coatings, however, and the mercaptans are generally known to adversely affect the ability of a coating to withstand weathering.

SUMMARY OF THE INVENTION

The present invention provides a process for preparing modified addition polymers that are useful in coating compositions, the addition polymers desirably having generally low molecular weights and narrow molecular weight distributions and accordingly being useful in the preparation of high solids, low viscosity coating formulations. The process of the invention does not utilize low boiling solvents as a reaction medium. As a result, the polymerization temperature may be carried well above 150° C. and preferably between about 175° C. and about 225° C., the high temperature of the polymerization generally favoring the formation of addition polymers having relatively low molecular weights and narrow molecular weight distributions. We have found that, in place of usual low boiling solvents, we may employ a molten composition comprising a reactive cyclic compound as the addition polymerization medium, the cyclic compound not only dissolving the ethylenically unsaturated monomer but itself being reactive with the monomers or resulting polymers. The ethylenically unsaturated monomers that are employed include monomers having hydroxyl or carboxyl functionality as representative of monomers having an active hydrogen capable of reacting with such cyclic compounds as epsilon-caprolactone, the latter being the preferred cyclic compound employed in the invention.

Thus, in one embodiment, the invention provides a method for producing a modified addition polymer from an ethylenically unsaturated monomer composition that includes at least one monomer having hydroxyl or carboxyl functionality. The method comprises polymerizing the monomer composition by dissolving it and a free radical initiator in a solvent-free molten composition maintained at a temperature supporting addition polymerization. The molten composition comprises a cyclic compound reactive, via ring opening, with the hydroxyl or carboxyl functionality. The ring-opened cyclic compound thus becomes bonded to the resulting addition polymer through reaction with the aforementioned carboxyl or hydroxyl groups.

To promote polymerization of the addition polymerizable monomers, and to facilitate the linking to the resulting addition polymer of the ring-opened cyclic compound through reaction with the aforementioned carboxyl or hydroxyl groups, the temperature of the solvent-free molten composition desirably is maintained above about 150° C. and preferably in the range of about 175° C. to about 225° C. The cyclic compound preferably may itself function as a monomer under the polymerization conditions described above, and most preferably is a lactone such as epsilon-caprolactone which, upon ring opening, may form ester linkages with the carboxyl or hydroxyl groups above mentioned and which may react with itself to form polycaprolactone chains pendent from the backbone of the resulting addition polymer.

DESCRIPTION OF THE PREFERRED EMBODIMENT

The solvent-free molten composition in which the addition polymerization reaction occurs contains one or more cyclic compounds which themselves are capable of ring-opening to react with hydroxyl or carboxyl groups carried by addition polymerizable monomers. The cyclic compounds hence (i) have boiling points above the desired addition polymerization temperature, (ii) are reactive, via ring opening, with OH and COOH groups, and (iii) are capable of dissolving addition polymerizable monomers. Examples of cyclic or ring type compounds include the lactones, the lactams and monoepoxide resins. Preferred are the lactones, particularly epsilon-caprolactone. The lactones may be thought of as internal esters, and, as pointed out below, not only react readily with hydroxyl or carboxyl groups of the addition polymerizable monomers, but also themselves undergo polymerization to form linear polymer units.

Other lactones include butyrolactone, and is contemplated that such lactones as beta-propiolactone, delta-valerolactone, delta-butyrolactone, zeta-enantholactone, eta-caprylolactone are appropriate for use in the present invention. Such lactones include substituted lactones such as 6-methyl-epsilon-caprolactone, 3-methyl-epsilon-caprolactone, 5-methyl-epsilon-caprolactone, 5-phenol-epsilon-caprolactone, 4-methyl-delta-valerolactone, 3,5-dimethyl-epsilon-caprolactone, and combinations thereof. The lactones useful in the present invention are capable, upon ring opening, of reacting with the hydroxyl or carboxyl groups of the addition polymerizable monomers to form ester groups therewith and thus to link to the addition polymer chain. Lactams, which may be considered to be internal amide esters, also may react with hydroxyl or carboxyl groups of the addition polymerizable monomers via a ring opening reaction to form ester or amide ester links with the addition polymer backbone. Such lactams as caprolactam and butyrolactam and their derivatives are contemplated as being usable in the present invention. Epoxide resins, and particularly monoepoxide resins, are contemplated for use in the present invention as well, such resins being liquids at addition polymerizable temperatures in the range of 150° C. and above. Epoxide groups are reactive with the e.g. carboxyl groups of addition polymerizable monomers to form epoxy ester linkages. Monoepoxide resins are preferred; the use of epoxy resins having more than one oxirane group per molecule in other than very small proportions is expected to give rise to undesired gelation. Epoxy resins contemplated for use in the present invention include the glycidyl ether of versatic acid ("Cardura E", a product of Shell Chemical Co.), phenyl glycidyl ether, 2-ethylhexyl glycidyl ether and the like.

The solvent-free molten composition thus described may contain other non-interfering materials such as fillers, pigments, catalysts, and surfactants, but it is preferred that the molten composition consist essentially of one or more (preferably only one) cyclic compound of the type described The addition polymerizable monomer composition that is dissolved in the cyclic compound composition comprises ethylenically unsaturated monomers including monomers having OH or COOH functionality or other groups containining an active hydrogen. Hydroxyl containing ethylenically unsaturated monomers include the hydroxy alkyl acrylates and methacrylates such as 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate and 4-hydroxybutyl methacrylate. Carboxyl containing ethylenically unsaturated monomers are exemplified by acrylic acid, methacrylic acid, itaconic acid, maleic acid, fumeric acid, and crotonic acid.

The ethylenically unsaturated addition polymerizable composition may include a variety of other monomeric species which are not carboxyl or hydroxyl functional, and exemplary of such monomeric species are alkyl methacrylates and acrylates (acrylates and methacrylates being collectively referred to sometimes herein as "(meth)acrylates") such as methyl (meth)acrylate, ethyl (meth)acrylate, butyl (meth)acrylate, hexyl (meth)acrylate, 2-ethylhexyl (meth)acrylate, nonyl (meth)acrylate, lauryl (meth)acrylate, stearyl (meth)acrylate, cyclohexyl (meth)acrylate, isodecyl (meth)acrylate, propyl (meth)acrylate, phenyl (meth)acrylate, and isobornyl (meth)acrylate, styrene or substituted styrenes such as methyl styrene, nitriles such as acrylonitrile and methacrylonitrile, alcohols such as allyl alcohol, amines such as (meth)acrylamide, and amines such as dimethylaminoethyl (meth)acrylate. The mole percentage of OH or COOH functional monomers in the ethylenically unsaturated monomer composition may be chosen within a wide range; mole percentages in the range of about 5 to 100% can be employed, the preferred range being from about 10% to about 40%.

The relative quantity of OH or COOH functional ethylenically unsaturated monomer is significant in that the OH or COOH groups participate in a ring-opening linking reaction with the chosen cyclic compound to form groups (e g , ester groups) linking the resulting ring-opened compound to the addition polymer backbone. The quantities of OH or COOH functional addition polymerizable monomers and of the cyclic compound and of other monomers may be varied within wide ranges to achieve ultimate polymers having desired characteristics. For example, the use of relatively large quantities of styrene as an ethylenically unsaturated monomer generally increases the glass transition temperature of the ultimate polymer that is formed. If, as with the lactones and lactams, the cyclic compound is capable of undergoing self polymerization, the molecular weight of the ring-opened chains will depend among other things upon the quantity of free OH or COOH groups that are contributed by monomers of the addition polymerizable composition, since these groups tend to initiate the ring opening reaction Lactones such as epsilon-caprolactone undergo self polymerization to form a polylactone structure, and such lactams as epsilon-caprolactam are capable of participating in a similar reaction. The fewer OH or COOH functional groups that are present, the higher will be the molecular weight of the ring-opened chain pendent to the addition polymer backbone.

Although the equivalent ratio of the reactive cyclic compound to the OH or COOH-functional monomers may vary within wide limits, it is preferred to use equivalent ratios in the range of about ½ to about 5/1 or greater. During the addition polymerization reaction, substantially all of the cyclic compound reacts to become bonded to the addition polymer backbone. By using a 1/1 mole ratio of caprolactone (as a typical cyclic compound) to hydroxyethyl acrylate (as a typical OH functional monomer), it would be expected that an average of one lactone unit would be attached via esterification at each previous OH site. Of course, certain of such sites will carry two or more lactone units, and certain sites will carry no lactone units. Thus, the length of the pendent chains formed by e.g. polylactone polymerization depends upon the initial mole ratio of caprolactone to hydroxyethyl acrylate in this typical example. Staying with this example, the amount of hydroxyethyl acrylate can be varied either by varying the mole ratio of this monomer to the total monomer of the addition polymerizable composition, or by simply increasing the relative amount of the addition polymerizable composition that is added to a given amount of cyclic compound. The relative quantities of cyclic compound and addition polymerizable monomer will also depend to some extent upon the mutual solubility of the monomer constituent and the cyclic compound, it being desired to avoid concentrations of monomer or cyclic compound as would cause occurrence of a haze or precipitate in the reaction mixture following the polymerization step.

In the process of the invention, a cyclic compound, typified herein as epsilon-caprolactone, is placed in a suitable reaction vessel, the lactone being free of solvent. The lactone is maintained at a desired addition polymerization temperature. An addition polymerizable composition as described above, containing, for example, hydroxyethyl acrylate, is blended with a free radical initiator and is added in increments to the hot lactone, the monomer dissolving in the lactone and undergoing free radical initiated addition polymerization. Preferably, the addition polymerization of the monomer is carried substantially to completion. A small additional amount of free radical initiator may be added near the end of the addition polymerization reaction to ensure that all ethylenically unsaturated groups have been reacted, leaving the solution substantially free of unreacted ethylenically unsaturated groups.

During the addition polymerization reaction, the epsilon caprolactone reacts with the available COOH or OH group contributed by the addition polymerizable monomer, and once the addition polymerization step has been carried substantially to completion, it is found that substantially all of the epsilon-caprolactone also has reacted. Typically, less than about 0.5% of the original epsilon-caprolactone remains unreacted at this point. An esterification catalyst such as dibutyl tin dilaurate, stannous octoate or p-toluene sulfonic acid may then be added to substantially complete reaction of the lactone, the free lactone concentration decreasing to 0.3% or less. Substantially all of the lactone is bound by ester groups to the addition polymer backbone; very little if any, of the lactone undergoes free polymerization.

The present invention thus provides for the use of higher than usual temperatures in the polymerization procedure, such temperatures resulting in polymers having relatively low molecular weights and narrow molecular weight distributions. When relatively low-boiling monomers are used, however, such as methyl methacrylate, the high polymerization temperatures that are employed can result in the vaporization of a small amount of this monomer, the monomer being redeposited on upper, cooler portions of a reaction vessel. We have found that this effect can be reduced or prevented by incorporating a very small amount of solvent—generally less than about 2% by weight—in the reaction mixture, the polymerization being carried out under reflux conditions causing the solvent to be vaporized from the reaction mixture and condensed in a reflux condenser, the condensed solvent washing down the walls of the container to carry deposited methyl methacrylate or other vaporized and redeposited monomer back down into the reaction mixture. The very small quantity of solvent thus employed does not have any appreciable effect upon the reaction temperature nor upon the polymerization reaction itself. Once the polymerization reaction is substantially completed, the minute quantities of reflux solvent that are used may be removed; this may occur readily by merely removing the condensed vaporized solvent from the reflux condensor, or by similar means.

If desired, a solvent such as xylene may be added to the reaction mixture after substantial completion of the polymerization reaction to provide a solvent solution of the polymerizate. When solvent is omitted, the resulting polymer mass often is a friable solid which can be subsequently powdered and employed in a coating composition as described more fully below.

The invention may be more easily understood by reference to the following non-limiting examples which are provided for illustrative purposes only:

EXAMPLE I

|  | Parts by Weight |
|---|---|
| Portion A |  |
| caprolactone | 200.0 |
| Portion B |  |
| hydroxyethyl methacrylate | 300.0 |
| butyl acrylate | 201.3 |
| styrene | 150.0 |
| methyl methacrylate | 150.0 |
| VAZO-67 (azo-bis-2-methyl butyronitrile, DuPont) | 8.0 |
| dicumyl peroxide (Hercules Chemical) | 8.0 |
| Portion C |  |
| dicumyl peroxide | 5.0 |
| xylene | 5.0 |
| Portion D |  |
| stannous octoate (MT-9, Air Products) | .2 |
| xylene | 220.0 |
|  | 1247.5 |

Portion A was charged to a 2-liter round bottom 4-necked flask equipped with condensor, stirrer, thermometer, addition flask and nitrogen inlet. Nitrogen flow was started and Portion A was heated to 200° C. The ingredients of Portion B were mixed at room temperature and were added slowly and continuously over a period of six hours to the reaction flask, the temperature being maintained at 200° C. After an additional 15 minutes, portion C was then added over a 15-minute period After an additional 15 minutes, portion D was slowly added to the flask. The temperature of the flask contents was allowed to fall to 160° C., which temperature was held for an additional six hours before further cooling to room temperature.

The resin composition exhibited a viscosity of X-Y (Gardner-Holt), a color of 1 (Gardner-Holt), a non-volatile content of 78.5%, an acid value of 2.3, and a density of 8.88 pounds per gallon (1.07 g/cc).

EXAMPLE II

|  | Parts by Weight |
|---|---|
| Portion A |  |
| epsilon caprolactone | 200.0 |
| Portion B |  |
| hydroxyethyl acrylate | 100.0 |
| styrene | 200.0 |
| methyl methacrylate | 500.0 |
| VAZO-67 | 10.0 |
| Portion B |  |
| hydroxyethyl acrylate | 100.0 |
| styrene | 200.0 |
| methyl methacrylate | 500.0 |
| VAZO-67 | 10.0 |
| Portion C |  |
| dicumyl peroxide | 5.0 |
| xylene | 5.0 |
| Portion D |  |
| stannous octoate | 0.2 |

Portion A was charged to a reaction flask equipped as in Example I and was heated to a temperature of 150° C. Portion B was separately mixed at room temperature and then was added continuously over a 5-hour period to the reaction flask, the temperature of the reaction flask contents increasing during this period to a range of 165°–170° C. Thereafter, the temperature was raised to 200° C. over a 50-minute period, and Portion C was added to the reaction flask contents over a period of one hour. Portion D was then added and the contents of the reaction flask were maintained at temperature for 7 hours, following which the contents were cooled and poured while still liquid into a metal pan and cooled further to room temperature. The resulting material was a friable solid capable of being ground into a powder for subsequent use in a powder coating composition.

EXAMPLE II

|  | Parts by Weight |
|---|---|
| Portion A |  |
| caprolactone | 200.0 |
| Portion B |  |
| hydroxyethyl methacrylate | 330.0 |
| butyl acrylate | 240.0 |
| styrene | 230.0 |
| dicumyl peroxide | 20.0 |
| VAZO-67 | 20.0 |
| Portion C |  |
| dicumyl peroxide | 5.0 |
| xylene | 5.0 |
| Portion D |  |
| stannous octoate | 0.2 |
| xylene | 210.0 |
|  | 1260.2 |

The listed ingredients were reacted in a suitable reaction flask in accordance with the procedure outlined in Example I. The resulting polymeric solution exhibited a viscosity of X (Gardner-Holt) a color of 3 (Gardner-Holt), and a solids (non-volatiles) content of 78.5%.

EXAMPLE IV

|  | Parts by Weight |
|---|---|
| Portion A |  |
| caprolactone | 200.0 |
| Portion B |  |
| acrylic acid | 72.0 |
| styrene | 200.0 |
| methyl methacrylate | 437.8 |
| butyl acrylate | 100.0 |
| VAZO-67 | 15.0 |
| Portion C |  |
| Lupersol 533-M75 | 5.0 |
| (a t-amyl peroxide, Pennwalt Corp.) |  |
| Portion D |  |
| Lupersol 533-M75 | 5.0 |
| Portion E |  |
| stannous octoate | 0.2 |
|  | 1035.0 |

Portion A was charged to a reaction flask equipped as in Example I, and was heated to 160° C. The ingredients of Portion B were mixed together at room temperature, and Portion B was then added continuously to the reaction flask over a period of 4 ¾ hours. During the addition of Portion B, the temperature slowly rose to 165°–170° C. The reaction mixture was held at this temperature for one hour and the temperature was then slowly raised to 180° C. Portion C was then added over a 5-minute period, the temperature being simultaneously raised to 194° C. The temperature of the reaction mixture was increased to 200° C. and the reaction mixture was allowed to stand at that temperature for about one hour. Portion D then was added over a 7-minute period. The reaction mixture was held at temperature for an additional two hours and was then slowly cooled to room temperature. A day later, the flask contents were heated at 200° C. and Portion E was added. After several hours, the reaction contents were cooled but while still liquid, poured into a metal pan. Upon further cooling to room temperature, the resin contents became a friable solid having an acid value of 50.6.

EXAMPLE V

|  | Parts by Weight |
|---|---|
| Portion A |  |
| xylene | 12.9 |
| Cymel 303 (melamine based cross-linker, American Cyanamid Co.) | 137.8 |
| MPA-1078 (an antisettling additive, NL Industries) | 3.0 |
| Portion B |  |
| Resin composition of Example I | 111.8 |
| Nuosperse 657 (a dispersing agent, HULS, Inc.) | 3.0 |
| TiO$_2$ (R-960, DuPont) | 466.0 |
| Portion C |  |
| Resin composition of Example I | 79.8 |
| diisobutyl ketone | 18.0 |
| Portion D |  |
| Resin composition of Example I | 298.4 |
| butyl cellosolve (Union Carbide) | 25.0 |
| PM acetate (a glycol ether acetate solvent, Dow Chemical) | 43.2 |
| paint additive 11 (a silicone flow control agent, Dow Corning) | .76 |
| Portion E |  |
| Nacure 1051 catalyst (an acid catalyst, King Industries) | 5.3 |

The ingredients in Portion A were blended together using a high speed mixer until warm (120°–130° F., approximately 49°–54° C.). Portion B, containing pigment, was then added and rapidly mixed until a value of 7 was attained on the Hegman scale. portions C and D were then added in sequence with stirring. Shortly before use of the resulting paint, Portion E was added with stirring. Sufficient xylene was added to adjust the viscosity of the resulting paint to a value of 48 seconds (Zahn No. 3 viscosity cup). The volatile organic content ("VOC") of the paint was found to be 2.25 pounds per gallon (about 0.27 Kg/liter).

The resulting paint was applied to phosphate-treated steel panels (sold under the trademark Bonderite 1000 by the Parker Chemical Company) and was baked for 30 minutes at 300° F. (149° C.). The result paint film was 1.2 mils (0.03 mm) thick, exhibited a pencil hardness of H-2H, and exhibited reverse impact strength of 20–30 pounds (9–13.6 Kg). A cloth saturated with methylethyl ketone was rubbed by hand on the surface; after 100 double rubs, no paint had been removed from the panel.

EXAMPLE VI

|  | Parts by Weight |
|---|---|
| Grind Paste |  |
| Portion I |  |
| Resin composition of Example I | 104.7 |
| MPA 1078X | 1.9 |

-continued

| | Parts by Weight |
|---|---|
| Portion II | |
| PM acetate | 38.4 |
| Bentone 34, 10% solu | 26.2 |
| Portion III | |
| Organic red pigment (Naphtho red F5RK-A, Hoechst-Celanese) | 13.0 |
| Organic red pigment (Naphtho red F3RK-70, Hoechst Celanese) | 13.0 |
| Nuosperse 657 | 2.6 |
| Iron oxide red, R-1599D (Pfizer, Inc.) | 15.0 |
| Iron oxide yellow, YLO-3288D | 5.0 |
| TiO$_2$ (R-902, DuPont) | 1.9 |
| Letdown | |
| Portion IV | |
| Diisobutyl ketone | 32.7 |
| Methyl propyl ketone ("MPK") | 81.2 |
| Tinuven 292 (U.V. absorber, Ciba-Geigy Corp.) | 2.57 |
| Portion V | |
| PM acetate | 19.24 |
| CAB 551-0.01 Powder (Eastman Chemical, flow agent) | 0.56 |
| Final Paint | |
| Portion VI | |
| Grind paste | 110.93 |
| xylene | 16.6 |
| Resin composition of Example I | 134.4 |
| Letdown | 73.6 |
| Portion VII | |
| Demodur N-75 (biuret of 1,6-hexamethylene diisocyanate, Mobay Chem. Corp.) | 88.3 |
| Portion VIII | |
| Dibutyltin dilaurate | 0.06 |

The Portion I ingredients are mixed with a high speed mixer for 10-15 minutes following which Portion II is added and is mixed for approximately 10 minutes. The ingredients of Portion III are then added, in order, with agitation, and stirred for approximately 15 minutes. The resulting mixture is put through a sand mill to provide a grind paste.

The ingredients of Portion V are mixed together and heated to above 130° F. (about 54° C.) to dissolve the powdered flow control agent. Portion IV is then blended into the resulting mixture to provide the letdown composition.

To manufacture the final paint, the ingredients of Portion VI were mixed together, and shortly before the paint was to be used, Portions VII and VIII are blended into the mixture.

The resulting paint was applied to a Bonderite 1000 metal panel and baked for 30 minutes at about 140° F. (about 60° C.). The resulting film had a thickness of about 1.5-1.7 mils (about 0.038-0.043 mm). The resulting film withstood a reverse impact (ASTM D 2794-84) of 120 pounds (about 54 Kg), and exhibited a pencil hardness of 2H after curing at ambient temperature for one week.

What is claimed is:

1. Method for producing a modified addition polymer from an ethylenically unsaturated monomer composition that includes at least one monomer having hydroxyl or carboxyl functionality, the method comprising polymerizing said monomer composition by dissolving it and a free radical initiator therefor in a solvent-free molten composition maintained at a temperature supporting addition polymerization of the monomer composition, the molten composition comprising a cyclic compound reactive via ring-opening with said hydroxyl or carboxyl functionality.

2. The method of claim 1 including the step of incorporating in the molten composition a catalyst for the reaction between the cyclic compound and the hydroxyl or carboxyl functionality.

3. The method of claim 2 wherein said catalyst is a metal salt.

4. The method of claim 1 wherein the cyclic compound is a lactone, a lactam or a monoepoxide 5. The method of claim 1 wherein the molten composition is maintained at a temperature of at least about 150° C.

6. The method of claim 1 wherein the ratio of reactive equivalents of the cyclic compound to the hydroxyl or carboxyl equivalents of the ethylenically unsaturated monomer composition is in the range of about ½ to about 5/1.

7. The method of claim 1 wherein the ethylenically unsaturated monomer composition comprises at least about 5 mole percent of hydroxyl or carboxyl functional monomers.

8. The method of claim 1 wherein the monomer composition comprises from about 10 to about 40 mole percent of hydroxyl or carboxyl functional monomers.

9. The method of claim 1 wherein the ethylenically unsaturated monomer composition comprises a hydroxyalkyl acrylate or a hydroxyalkyl methacrylate.

10. The method of claim 1 wherein the ethylenically unsaturated monomer composition comprises acrylic acid or methacrylic acid.

11. The method of any of claims 1-10 in which the cyclic compound is epsilon-caprolactone.

12. Method for producing a modified addition polymer comprising dissolving, in solvent-free epsilon-caprolactone maintained at a temperature of at least about 150° C., an ethylenically unsaturated monomer composition comprising from about 10 to about 40 mole percent of a hydroxyl or carboxyl-functional monomer together with a free radical initiator, and maintaining the resulting solution at a temperature supporting addition polymerization of the unsaturated monomer composition and bonding of ring-opened epsilon-caprolactone thereto by reaction with said hydroxyl or carboxyl groups.

* * * * *